United States Patent [19]
Izumi et al.

[11] Patent Number: 5,674,316
[45] Date of Patent: Oct. 7, 1997

[54] HYDRAULIC COMPOSITION

[75] Inventors: Tatsuo Izumi; Hotaka Yamamuro; Shin Murahara; Takaaki Tadokoro, all of Wakayama, Japan

[73] Assignee: Kao Corporation, Tokyo, Japan

[21] Appl. No.: 491,569

[22] Filed: Jun. 16, 1995

[30] Foreign Application Priority Data

Jun. 30, 1994 [JP] Japan ............................ 6-149327

[51] Int. Cl.$^6$ .................................................. C04B 24/00
[52] U.S. Cl. ...................... 106/724; 106/725; 106/727; 106/728; 106/823
[58] Field of Search .................................... 106/696, 724, 106/725, 727, 728, 802, 808, 809, 810, 823

[56] References Cited

U.S. PATENT DOCUMENTS

| | | | |
|---|---|---|---|
| 4,116,706 | 9/1978 | Previte | 106/727 |
| 4,209,336 | 6/1980 | Previte | 106/725 |
| 4,888,059 | 12/1989 | Yamaguchi et al. | 106/823 |

FOREIGN PATENT DOCUMENTS

| | | |
|---|---|---|
| 0025143 | 8/1981 | European Pat. Off. . |
| 0095695 | 7/1983 | European Pat. Off. . |
| 0200471 | 5/1986 | European Pat. Off. . |
| 0291590 | 11/1988 | European Pat. Off. . |
| 0549280 | 12/1992 | European Pat. Off. . |
| 49-104919 | 10/1974 | Japan . |
| 50-63015 | 5/1975 | Japan . |
| 59-162163 | 9/1984 | Japan . |
| 61-174155 | 8/1986 | Japan . |
| 62-83344 | 4/1987 | Japan . |
| 62-35984 | 8/1987 | Japan . |
| 63-5346 | 2/1988 | Japan . |
| 1-113419 | 5/1989 | Japan . |
| 1-270550 | 10/1989 | Japan . |
| 27897 | 2/1990 | Japan . |
| 27901 | 2/1990 | Japan . |
| 28983 | 2/1990 | Japan . |
| 2-11542 | 3/1990 | Japan . |
| 375252 | 3/1991 | Japan . |
| 5085788 | 4/1993 | Japan . |
| 5-85788 | 4/1993 | Japan . |

OTHER PUBLICATIONS

Concrete Engineering Annual Report Summary, pp. 699–704 No Date Available.

*Primary Examiner*—Paul Marcantoni
*Attorney, Agent, or Firm*—Birch, Stewart, Kolasch & Birch, LLP

[57] ABSTRACT

The present invention is directed to a hydraulic composition comprising (a) a water soluble polymer, (b) a superplasticizer which is a copolymer obtained by polymerizing a monomer (C-1) represented by the following Formula (1) with at least one monomer (C-2) selected from the compounds represented by the following Formulas (2) and (3):

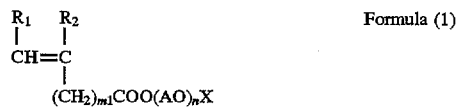

(wherein $R_1$ and $R_2$ each represent hydrogen or methyl; ml represents an integer of 0 to 32; AO represents an oxyalkylene group having a carbon number of 2 to 3; n represents an integer of 2 to 300; and X represents hydrogen or an alkyl group having a carbon number of 1 to 3);

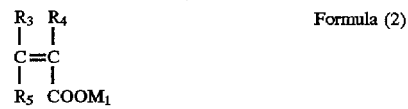

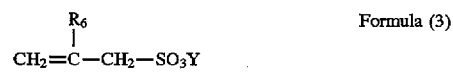

(wherein $R_3$ to $R_5$ each represent hydrogen, methyl or $(CH_2)_{m2}COOM_2$; $R_6$ represents hydrogen or methyl; $M_1$, $M_2$ and Y each represent hydrogen, alkali metal, alkaline earth metal, ammonium, alkylammonium, or substituted alkylammonium; and $M_2$ represents an integer of 0 to 2); and (c) a hydraulic powder.

9 Claims, No Drawings

HYDRAULIC COMPOSITION

FIELD OF THE INVENTION

The present invention relates to a hydraulic composition having a high flowability and requiring no compaction. More specifically, the present invention relates to a hydraulic composition which increases the viscosities and flowabilities of concrete, mortar and paste used as construction materials and secondary product materials and gives excellent properties to the segregation resistances of aggregate, cement and water and which requires no compaction by vibration with a vibrator.

DESCRIPTION OF THE RELATED ARTS

In general, in a conventional method for applying concrete compositions, a concrete is put into forms in which reinforcing steel bars are disposed and then compacted by vibration with a vibrator. In recent years, however, problems have been raised on noise pollution caused by the vibrators in compacting the concrete and the lack of manpower in the concrete industry.

In view of these problems, researches on a self-packing concrete requiring no compaction with vibration have been started but the existing state is that it has not yet been put into practical use in terms of a technique.

In general, increasing the flowability of a concrete not only causes the segregation of aggregate and entangles coarse aggregates to deteriorate a packing property but also does not provide homogeneous concrete, which leads to a reduction in the strength of concrete. While the segregation of aggregates is controlled in a concrete blend wherein large amount of a thickener is added such as underwater concrete, not only viscosity is markedly increased (for example, in case of the concrete composition for applying in water disclosed in JP-B-62-35984, water for kneading concrete has viscosities of 500 to 5000 cps) to make packing difficult, but also the development of an initial strength is delayed due to the delay of setting time which is one of the properties of the thickener, which leads to the situation that it is difficult to apply the above concrete blend to construction and engineering work, and particularly to secondary products.

A concrete composition requiring no compaction, which has recently been reported under the name of high performance concrete [Concrete Engineering Annual Report Summary, pp. 63 to 68 (1989)], is prepared by adding large amount of fine powders such as blast furnace slag and fly ash and further a thickener and improved in setting time as compared with the underwater concrete described above. However, because the above composition contains a large amount of powders, a lot of water is required. In addition, because a water/cement ratio is 100% in the raw materials, the situation is that it is difficult to use the above composition for secondary products requiring early demolding.

SUMMARY OF THE INVENTION

Extensive investigations made by the present inventors in order to obtain a self-packing concrete composition which has a high flowability and a large segregation resistance and which has a self-packing property and exerts less influence attributable to delayed setting to a strength have resulted in completing the present invention.

The invention primarily provides a hydraulic composition comprising (a) a water soluble polymer, (b) a superplasticizer, and (c) a hydraulic powder.

The water-soluble polymer (a) is preferable is an associacive thickener, in particular an alkylene oxide adduct to an organic compound having at least one functional or active group selected from the group consisting of mercapto, alcoholic hydroxyl, phenolic hydroxyl, amino and carboxyl.

The water-soluble polymer (a) is preferably a polyalkylene oxide derivative obtained by addition of 10 to 1000 moles of alkylene oxide to a monohydric alcohol having 6 to 30 carbon atoms in the molecule, a monovalent mercaptan compound having 6 to 30 carbon atoms in the molecule, or an alkylphenol having 6 to 30 carbon atoms in the molecule or an associacive thickener being an adduct of 10 to 1000 moles of an alkylene oxide to an organic compound having an active hydrogen atom in its functional or active group and 6 to 30 carbon atoms.

That is, the present invention relates to a hydraulic composition comprising (a) a water soluble polymer comprising a polyalkylene oxide derivative obtained by the addition of 10 to 1000 moles of alkylene oxide to a monohydric alcohol having 6 to 30 carbon atoms in the molecule, a monovalent mercaptan having 6 to 30 carbon atoms in the molecule, or an alkylphenol having 6 to 30 carbon atoms in the molecule, (b) a superplasticizer such as (b-A) and (b-B) and (c) a hydraulic powder.

In the composition, it is preferable that a weight ratio of (a) to (b) ranges from 95/5 to 5/95.

The superplasticizer (b) includes embodiments (b-A), (b-B) and (b-C), each being below defined. In addition, the superplasticer includes a combination of (b-A), (b-B) and (b-C) with each another, in particular (b-A) with (b-B).

The invention further provides a hydraulic composition containing (a) a water soluble polymer comprising a polyalkylene oxide derivative, (b-A) a polymer or copolymer obtained by polymerizing at least one monomer selected from the group consisting of unsaturated monocarboxylic acids and derivatives thereof, and unsaturated dicarboxylic acids and derivatives thereof, (b-B) a formaldehyde condensation product of at least one compound selected from the group consisting of methylolation or sulfonation products of any of naphthalene, melamine, phenol, urea, and aniline, and (c) a hydraulic powder.

The invention moreover provides an additive mixture for cement comprising (a) and (b-C).

It is preferable that the superplasticizer is a combination of (b-A) with (b-B) at a weight ratio of (b-A) to (b-B) ranging from 60/40 to 99/1 as the effective matters.

It is also preferable that the superplasticizer is a combination of (b-C) with (b-B) at a weight ratio of (b-C) to (b-B) ranging from 60/40 to 99/1 as the effective matters.

When the hydraulic composition of the present invention is used as a concrete requiring no compaction, a slump value in the slump test stipulated in JIS A 1101 is required to be 50 or more. In order to secure a sufficient packing property, the slump value is preferably 50 to 70 cm. A slump value less than 50 cm can not secure the sufficient packing property. A slump value exceeding 70 cm causes the segregation of cement paste from ballast and generates clogging with ballast between reinforcing steel bars, which results in causing insufficient packing property to be obtained.

Cement or a mixture of cement with a fine powder having a fineness of 3,000 cm$^2$/g or more is preferred as the hydraulic powder in the present invention. At least one fine powder selected from the group consisting of blast furnace slag, fly ash, silica fume, and stone powder is used as the fine powder having a fineness of 3,000 cm$^2$/g or more. In view of cost and supply, blast furnace slag, fly ash and stone powder are preferred. With respect to the fineness of fine powders, the higher the specific surface area, the better in terms of a segregation resistance. For example, in case of blast furnace slag, 5,000 to 10,000 cm$^2$/g is preferred. Even if the fineness is lower than this range, increasing a blend amount can provide a prescribed segregation resistance.

The representative examples of the monohydric alcohol having 6 to 30 carbon atoms in the molecule, monovalent mercaptan having 6 to 30 carbon atoms in the molecule, or alkylphenol having 6 to 30 carbon atoms in the molecule include alkylphenols such as octylphenol, nonylphenol, dodecylphenol, diamylphenol, dioctylphenol, and dinonylphenyl, monohydric aliphatic alcohols such as dodecyl alcohol, tridecyl alcohol, hexadecyl alcohol, 2-hexyldecyl alcohol, and octadecyl alcohol, alicyclic monohydric alcohols such as abiethyl alcohol, or monovalent aliphatic mercaptans such as dodecylmercaptan. They can be used singly or in a mixture of two or more kinds thereof.

The alkylene oxide adduct (polyalkylene oxide derivative) suitable for use in the present invention is prepared by adding 10 to 1,000 moles of ethylene oxide alone or both ethylene oxide and propylene oxide at random or blockwise to a monohydric alcohol having 6 to 30 carbon atoms, a monovalent mercaptan having 6 to 30 carbon atoms, or a alkylphenol having 6 to 30 carbon atoms each in the molecule.

Ethylene oxides and propylene oxide are suited as alkylene oxide. In terms of performance, an addition mole ratio of the combination of both is preferably 80 mole % or more for ethylene oxide and about 20 mole % or less for propylene oxide, and an addition molar number is preferably 100 to 500 moles. Alkylene oxide adduct suitable for use In the present invention can contain polyalkylene oxide by-produced in the production of the adduct. The polyalkylene oxide does not provide any problems on the revelation of performances.

The addition amount of the water soluble polymer differs in an optimum amount depending on the length of alkylene oxide chain in the molecule, and 0.01 to 10.0 weight % based on the water amount required in producing the hydraulic composition is suitable.

In the present invention, representative examples of the organic compounds having functional groups such as a mercapto group, an alcoholic hydroxyl group, a phenolic hydroxyl group, an amino group, and a carboxyl group and having carbon numbers of 8 to 30 include dodecanethiol, stearylmercaptan, dodecyl alcohol, nonyl alcohol, stearyl alcohol, dodecylphenol, nonylphenol, dodecylamlne, nonylamine, stearylamlne, lauric acid (dodecanoic acid), nonanoic acid, and stearic acid. They can be used singly or in a mixture of two or more kinds thereof.

An associative thickener suited to use in the present invention includes compounds obtained by reacting mercaptans, alcohols, phenols, and carboxylic acids having active hydrogen in the functional groups described above and having the carbon numbers of 6 to 30 with 10 to 1000 moles of ethylene oxide, propylene oxide or ethylene oxide and propylene oxide by any of random, block and alternating processes.

In order to obtain a high flowability (slump flow value: 50 cm or more) in the hydraulic composition of the present invention, a superplasticizer is preferably added in 0.3 to 3.0 weight % based on cement in terms of an effective ingredient. The superplasticizer includes the formaldehyde condensation products of at least one compound selected from the group consisting of methylolation and sulfonation products of any of naphthalene, melamine, phenol, urea, and aniline, for example, the formaldehyde condensation products of naphthalenesulfonic acid metal salts (for example, Mighty 150: manufactured by Kao Corporation), the formaldehyde condensation products of melaminesulfonic acid metal salts (for example, Mighty 150-V2: manufactured by Kao Corporation), the formaldehyde compounds of phenolsulfonic acid (Japanese Patent No. 1097647), and phenol sulfanilic acid formaldehyde copolycondensation products (JP-A-1-113419). Further, the superplasticizer includes polymers or copolymers obtained by polymerizing at least one monomer selected from the group consisting of unsaturated monocarboxylic acids and derivatives thereof, and unsaturated dicarboxylic acids and derivatives thereof. Please see JP-B-2-7901, JP-A-3-75252, and JP-B-2-8983. The hydraulic composition of the present invention is used for a concrete molding. The concrete molding is not specifically limited and includes moldings which are usually compacted with a vibrator.

The superplasticizer to use in the invention includes (b-C) a copolymer obtained by polymerizing a monomer (C-1) represented by the following Formula (1) with at least one monomer (C-2) selected from the compounds represented by the following Formulas (2) and (3).

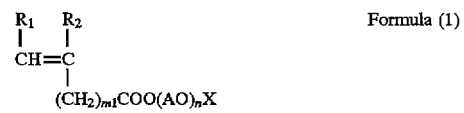

Formula (1)

(wherein $R_1$ and $R_2$ each represent hydrogen or methyl; ml represents an integer of 0 to 32; AO represents an oxyalkylene group having a carbon number of 2 to 3; n represents an integer of 2 to 300; and X represents hydrogen or an alkyl group having a carbon number of 1 to 3.)

Formula (2)

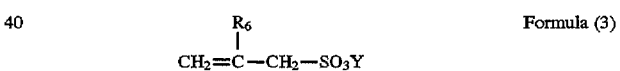

Formula (3)

(wherein $R_3$ to $R_5$ each represent hydrogen, methyl or $(CH_2)_{m2}COOM_2$; $R_6$ represents hydrogen or methyl; $M_1$, $M_2$ and Y each represent hydrogen, alkali metal, alkaline earth metal, ammonium, alkylammonium, or substituted alkylammonium; and $m_2$ represents an integer of 0 to 2.)

It is preferable that the copolymer has a mole ratio of (C-1) to (C-2) in the range between 0.1/100 and 100/100; or the copolymer has a weight-average molecular weight of 3000 to 1000000 according to gel permeation chromatographic method as sodium polystyrene sulfonate.

It is preferable that a weight ratio of (a) to (b-C) ranges from 95/5 to 5/95; (a) is an associative thickener; being an adduct of 10 to 1000 moles of an alkylene oxide to an organic compound having an active hydrogen atom in its functional or active group and 6 to 30 carbon atoms; or the functional or active group is selected from the group consisting of mercapto, alcoholic hydroxyl, phenolic hydroxyl, amino and carboxyl.

In the copolymer (b-C) of the present invention, there are used as the monomer (C-1) represented by Formula (1), (esters of polyalkylene glycol blocked by alkyl at one terminal such as methoxypolyethylene glycol, methoxypolyethylenepolypropylene glycol, ethoxypolyethylene glycol, ethoxypolyethylenepolypropylene glycol, propoxypolyethylene glycol, and Propoxypolyethylenepolypropylene glycol with acrylic acid, methacrylic acid, or a dehydrogenation (oxidation) product of aliphatic acid) and (adducts of ethylene oxide and propylene oxide to acrylic acid, methacrylic acid, or a dehydrogenation (oxidation) product of aliphatic acid). Any of ethylene oxide, propylene oxide, and random, block or alternating product of ethylene oxide and propylene oxide can be used as a repetitive monomer for polyalkylene glycol.

The molar number of repetitive monomers for polyalkylene glycol ranging from 110 to 300 is particularly preferred in terms of shortening of delay in setting, a high flowability, a high packing property, and a high reduction in segregation.

The compound represented by Formula (2) includes acrylic acid, methacrylic acid, crotonic acid, and the metal salts thereof. There are used as an unsaturated dicarboxylic acid series monomer, maleic anhydride, maleic acid, itaconic anhydride, itaconic acid, citraconic anhydride, and cotraconic acid, or the alkali metal salts, alkaline earth metal salts, ammonium salts, amine salts and substituted amine salts thereof.

There are used as the compound represented by Formula (3), allylsulfonic acid and methallylsulfonic acid, or the alkali metal salts, alkaline earth metal salts, ammonium salts, amine salts and substituted amine salts thereof.

With respect to the reaction unit of the monomer (C-1) and the monomer (C-2) constituting the copolymer (b-C) of the present invention, particularly the ranges of monomer (C-1)/monomer (C-2)=0.1/100 to 100/100 (mole ratio) provide excellent flowability and segregation resistance. The above mole ratio smaller than 0.1/100 gives the flowability which tends to lower, and that larger than 100/100 gives the segregation resistance which tends to lower.

The copolymer (b-C) of the present invention can be produced by known methods. They include, for example, the solvent polymerization processes described in JP-A-59-162163, JP-B-2-11542, JP-B-2-7901, and JP-B-2-7897.

Solvents used in the solvent polymerization process include water, methyl alcohol, ethyl alcohol, isopropyl alcohol, benzene, toluene, xylene, cyclohexane, n-hexane, aliphatic hydrocarbons, ethyl acetate, acetone, and methyl ethyl ketone. In view of handling and reaction facilities, water and primary to quaternary alcohols are preferred.

Water soluble initiators such as persulfates of ammonium or alkali metal and hydrogen peroxide are used as an aqueous series polymerization initiator. Benzoyl peroxide and lauroyl peroxide are used as a polymerization initiator for the solvent polymerization using solvents other than aqueous series solvents.

Further, sodium sulfite, mercaptoethanol and amine compounds can be used as a setting accelerator in combination with the polymerization initiator. These polymerization initiator and setting accelerator can suitably be selected and used.

The copolymer (b-C) of the present invention has a weight-average molecular weight (gel permeation chromatography/converted in terms of polystyrenesulfonic acid) falling in a range of preferably 3,000 to 1,000,000, more preferably 5,000 to 100,000. Too large molecular weight lowers a flowability, and too small a molecular weight decreases a segregation resistance.

Further, the copolymer (b-C) of the present invention may be reacted with other copolymerizable monomers as long as the effects of the present invention are not reduced. Such copolymerizable monomers include, for example, acrylonitrile, acrylic esters, acrylamide, methacrylamide, styrene, and styrenesulfonic acid.

The blend ratio of the copolymer (b-C) to the water soluble polymer (a) is preferably a level of (b-C)/(a)=95/5 to 5/95, more preferably 90/10 to 30/70.

The addition amount of the admixture of the present invention is preferably 0.01 to 10.0 weight % in terms of a solid, more preferably 0.1 to 2.0 weight % based on cement.

In a method for adding the superplasticizer used in the present invention to a cement blend, the superplasticizer can be added in the form of either an aqueous solution or powder. With respect to the addition timing thereof, the superplasticizer can be added in dry-blending with cement, by dissolving in water for kneading, or starting the kneading of the cement blend, that is, simultaneously with water addition to the cement, or at the period from immediately after the water addition up to finishing the kneading of the cement blend. It can be added as well to the cement blend once kneaded. Further, there can be employed either a method in which the whole amount is added in one lump or a method in which the whole amount is added dividing into several portions.

When publicly known dispersants are used in combination, they may be mixed in advance with ligninsulfonic acid and the salts thereof, oxycarboxylic acid and the salts thereof, polycarboxylic acid and the salts thereof, and polyalkylcarboxylic anhydride and the salts thereof (for example, JP-B-63-5346, JP-A-62-83344, and JP-A-1-270550), or after one is blended into cement or a cement blend or after one is blended into cement or a cement blend and kneaded, the other may be blended.

Further, there can be used other cement additives (materials), for example, gradually releasing dispersants, AE water reducing agents, fluidizing agents, plasticizers, retardants, early strength agents, setting accelerators, foaming agents, blowing agents, defoaming agents, water-retaining agent, thickeners, self leveling agents, waterproofing agents, rust preventives, colorants, fungicides, crack reducers, polymer emulsions, other surface active agents, other water soluble polymers, expanding agents (materials), and glass fibers. They can be used singly or in combination of plural kinds thereof.

Because the hydraulic composition of the present invention makes it possible to secure high flowability, segregation resistance of aggregate, and strength, a method for using concrete and a method for applying concrete are markedly improved. Particularly in the production of concrete products, large repercussion effects to noise prevention and production rationalization are expected.

EXAMPLES

The present invention is described in detail below with reference to preparation examples and examples. The present invention, however, is not limited to these examples. "%" in the following examples means "weight %" unless otherwise described. Example I using (a) and (b-A) or (b-B)
<Materials>
Water (W): city water
Cement (C): normal portland cement (specific gravity: 3.17)
Fine aggregate (S): sand obtained in Kinokawa (specific gravity: 2.57)
Coarse aggregate (G): crashed stones obtained in Takarazuka (specific gravity: 2.62)
Fine powder (F)
Blast furnace slag: specific surface area 8,000 $cm^2/g$, specific gravity: 2.90
Fly ash: specific surface area 3,600 $cm^2/g$, specific gravity: 2.90
Stone powder: specific surface area 3,500 $cm^2/g$, specific gravity: 2.70
<Method for kneading concrete>
A cement dispersant is dissolved in advance in water for kneading, and a concrete of 50 liters was kneaded at 20° C.

for 3 minutes with a tilted cylinder mixer of 100 liters. Then, the slump flow and aggregate segregation resistance were measured.

The blend composition of the concrete composition prepared using the materials described above, and the plasticizers and water soluble polymers used are shown in Tables 1 to 3.

TABLE 1

| Blend No. | W/P*[1] (%) | Unit amount (kg/m³) | | | | | Fine powder (F) (volume ratio) | Powder amount*[2] (vol. %) |
|---|---|---|---|---|---|---|---|---|
| | | W | C | F | S | G | | |
| 1 | 36.2 | 167 | 304 | 157 | 777 | 893 | Slag | 15.0 |
| 2 | 30.9 | 167 | 370 | 171 | 740 | 851 | Stone powder | 18.0 |
| 3 | 21.9 | 167 | 425 | 336 | 656 | 754 | Fly ash | 25.0 |
| 4 | 35.1 | 167 | 476 | — | 777 | 893 | — | 15.0 |
| 5 | 34.0 | 167 | 370 | 121 | 765 | 879 | Slag/stone powder (50/50) | 16.0 |

*[1]: P = C + F
*[2]: Powder amount = C + F / whole concrete composition

TABLE 2

| Division | No. | Plasticizer |
|---|---|---|
| Invention | 1 | Naphthalenesulfonic acid salt-formaldehyde condensation product (trade name: Mighty 150, manufactured by Kao Corporation) |
| | 2 | Melaminesulfonic acid salt-formaldehyde condensation product (trade name: Mighty 150V-2, manufactured by Kao Corporation) |
| | 3 | Phenolsulfonic acid salt-formaldehyde condensation product (sample prepared according to Synthetic Example No. 7 in Patent No. 1097647) |
| | 4 | Phenol°sulfanilic acid salt-formaldehyde copolycondensation product (sample produced according to Example 15 in JP-A-1-113419) |
| | 5 | Copolymer of alkylene oxide-added monomer and carboxylic acid series monomer (sample produced according to Reference Example 5 in JP-B-2-7901) |
| | 6 | Polycarboxylic acid copolymer (sample produced according to the synthetic example in JP-B-2-8983) |
| | 7 | Polycarboxylic acid copolymer (trade name: FC600S, manufactured by Nippon Catalyst Chemical Co., Ltd.) |
| Comparison | 8 | Ligninsulfonic acid salt (trade name: SAN-EX, manufactured by Sanyo Kokusaku Pulp Co., Ltd.) |

TABLE 3

| Division | No. | Water soluble polymer |
|---|---|---|
| Invention | 1 | Water soluble polymer prepared in the following Preparation Example 1 |
| | 2 | Water soluble polymer prepared in the following Preparation Example 2 |
| | 3 | Water soluble polymer prepared in the following Preparation Example 3 |
| | 4 | Water soluble polymer prepared in the following Preparation Example 4 |
| | 5 | Water soluble polymer prepared in the following Preparation Example 5 |
| Comparison | 6 | Methyl cellulose (trade name: CMC Daicel 1170, manufactured by Daicel Chemical Ind. Co., Ltd.) |

Preparation Example 1

Ethylene oxide of 200 moles was added to Kalcohol (trade name of the mixture of stearyl alcohol and cetanol, produced by Kao Corporation) in nitrogen atmosphere at 140° C. in the presence of an alkali catalyst.

Preparation Example 2

According to Preparation Example 1, ethylene oxide and propylene oxide (mole ratio 10:1) were added to nonylphenol at random (the added molar number of ethylene oxide: 200 and the added molar number of propylene oxide: 20).

Preparation Example 3

According to Preparation Example 1, ethylene oxide of 450 moles was added to dodecylmercaptan.

Preparation Example 4

According to Preparation Example 1, ethylene oxide of 750 moles was added to palmityl alcohol.

Preparation Example 5

According to Preparation Example 1, ethylene oxide of 20 moles was added to abiethyl alcohol.

<Evaluation items>

1. Slump flow:

Slump flow value (cm) according to JIS A 1101.

2. Segregation resistance:

Evaluation was made visually (with naked eyes).
   The criteria for evaluation are as follows:

○: no aggregate and water segregations;

x; aggregate and water segregations observed.

3. Self-packing property:

After kneading a concrete, it was compacted into a cylindrical form having an inner diameter of 10 cm, and after setting and demolding, the packing state on the surface of the concrete was visually observed. The criteria for evaluation are as follows:

○: no voids of 3 mm or more were formed;

Δ: voids of 3 mm or more were slightly formed;

x: many voids of 3 mm or more were formed.

The above measuring results are shown in Table 4.

TABLE 4

| Division | Blend No. | Plasticizer No. | Plasticizer Amount* (%) | Water soluble polymer No. | Amount** (%) | Slump flow (cm) | Segregation resistance | Self-packing property |
|---|---|---|---|---|---|---|---|---|
| Invention product | 3 | 1 | 2.1 | 1 | 0.5 | 62.5 | O | O |
| | | | 2.0 | 2 | 0.4 | 63.0 | O | O |
| | | | 2.2 | 3 | 0.4 | 60.0 | O | O |
| | 2 | 2 | 2.5 | 2 | 2.0 | 58.5 | O | O |
| | | | 2.4 | 4 | 0.8 | 61.5 | O | O |
| | | | 2.5 | 5 | 4.0 | 64.5 | O | O |
| | 4 | 3 | 1.8 | 1 | 1.0 | 56.0 | O | O |
| | | | 1.8 | 3 | 0.8 | 68.0 | O | O |
| | | | 1.8 | 5 | 3.2 | 65.5 | O | O |
| | | 4 | 1.7 | 1 | 1.0 | 60.0 | O | O |
| | | | 1.6 | 3 | 0.8 | 64.5 | O | O |
| | | | 1.7 | 5 | 3.2 | 59.0 | O | O |
| | | 5 | 1.4 | 1 | 2.0 | 62.5 | O | O |
| | | | 1.4 | 3 | 1.5 | 54.5 | O | O |
| | | | 1.4 | 5 | 4.0 | 63.0 | O | O |
| | | 7 | 1.0 | 1 | 2.1 | 68.5 | O | O |
| | | | 1.1 | 3 | 1.6 | 61.5 | O | O |
| | | | 1.2 | 5 | 4.2 | 57.5 | O | O |
| | 5 | 6 | 0.9 | 2 | 2.1 | 59.0 | O | O |
| | | | 0.8 | 4 | 0.8 | 60.5 | O | O |
| | | | 0.9 | 5 | 4.2 | 62.0 | O | O |
| | | 7 | 1.0 | 2 | 2.2 | 64.5 | O | O |
| | | | 1.2 | 4 | 0.8 | 68.5 | O | O |
| | | | 1.2 | 5 | 4.4 | 62.0 | O | O |
| | 1 | 1 | 2.3 | 1 | 0.4 | 58.5 | O | O |
| | | | 2.4 | 2 | 0.2 | 60.0 | O | O |
| | | | 2.2 | 4 | 0.1 | 62.5 | O | O |
| | | 7 | 1.1 | 1 | 0.7 | 66.5 | O | O |
| | | | 1.2 | 2 | 0.4 | 60.5 | O | O |
| | | | 1.1 | 4 | 0.3 | 63.0 | O | O |
| Comp. product | 4 | 8 | 3.0 | 1 | 1.5 | 36.0 | O | X |
| | | 8 | 4.0 | 1 | 1.5 | 43.5 | O | X |
| | | 8 | 5.0 | 1 | 1.5 | 47.0 | O | X |
| | | 8 | 4.0 | 4 | 1.5 | 40.5 | O | X |
| | | 4 | 1.6 | 6 | 0.04 | 42.0 | X | X |
| | | 4 | 1.6 | 6 | 0.10 | 34.5 | O | X |

*weight % based on cement
**weight % based on water

Example II using (a), (b-A) and (b-B)

Preparation Example 7

Vinylcyclohexene diepoxide (epoxy equivalent: 76) of 2.4 g was added to an adduct 85 g prepared by adding ethylene oxide of 200 moles to Kalcohl 86 (trade name, manufactured by Kao Corporation; mixture of stearyl alcohol and cetanol) in the presence of an alkali catalyst. The mixture was reacted at 140° C. for 3 hours and then neutralized with acetic acid.

Preparation Example 8

Vinylcyclohexene diepoxide (epoxy equivalent: 76) of 3.3 g was reacted with a random adduct 100 g (the molar number of added ethylene oxide: 200, the molar number of added propylene oxide: 20) of nonylphenol with ethylene oxide and propylene oxide (mole ratio: 10:1) synthesized according to Preparation Example 7 to obtain a reaction product.

Preparation Example 9

Vinylcyclohexene diepoxide (epoxy equivalent: 76) of 6.6 g was reacted with a random adduct 100 g (the added molar number: 100) of dodecylmercaptan with ethylene oxide synthesized according to Preparation Example 7 to obtain a reaction product.

Preparation Example 10

Diphenylmethanediisocyanate of 0.6 g was added to an adduct 100 g (the added molar number: 20) of ethylene oxide with abiethyl alcohol synthesized according to Preparation Example 7 to obtain a reaction product.

Preparation Example 11

A random adduct 100 g (the molar number of added ethylene oxide: 300, the molar number of added propylene oxide: 60) of ethylene glycol with ethylene oxide and propylene oxide (mole ratio: 10:2) synthesized according to Preparation Example 7 was reacted with behenic acid of 4.1 g in chloroform in a reflux condition for 5 hours in the presence of a solid catalyst.

Preparation Example 12

Polyethylene glycol (average molecular weight: 10,000) was reacted with vinylcyclohexene diepoxide (epoxy equivalent: 76) of 0.2 g at 140° C. for 3 hours in the presence of an alkali catalyst. Then, polyoxyethylene lauryl alcohol glycidyl ether (epoxy equivalent: 952) of 8.5 g was added and reacted at 140° C. for 3 hours, followed by neutralizing with acetic acid.

TABLE 5

| Division | Blend No. | Plasticizer No. | Amount* (%) | No. | Amount* (%) | Water soluble polymer No. | Amount** (%) | Slump flow value (cm) 0 min | 60 min | 120 min | Segregation resistance | Self-packing property |
|---|---|---|---|---|---|---|---|---|---|---|---|---|
| Invention product | 1 | 1 | 0.1 | 5 | 0.9 | 1 | 2.0 | 65.0 | 62.0 | 60.5 | ○ | ○ |
| | | | 0.2 | 6 | 0.8 | 2 | 2.0 | 63.0 | 60.0 | 58.5 | ○ | ○ |
| | | | 0.6 | 7 | 0.9 | 10 | 1.2 | 64.5 | 62.0 | 60.0 | ○ | ○ |
| | | 2 | 0.05 | 5 | 0.95 | 1 | 1.8 | 58.5 | 58.0 | 56.0 | ○ | ○ |
| | | | 0.1 | 6 | 0.9 | 7 | 1.0 | 59.5 | 59.0 | 57.5 | ○ | ○ |
| | | | 0.4 | 7 | 1.8 | 11 | 0.8 | 60.5 | 60.0 | 59.0 | ○ | ○ |
| | 2 | 3 | 0.1 | 5 | 0.9 | 2 | 9.0 | 62.5 | 61.0 | 58.5 | ○ | ○ |
| | | | 0.1 | 6 | 0.9 | 3 | 6.0 | 60.5 | 59.0 | 57.0 | ○ | ○ |
| | | | 0.1 | 7 | 0.9 | 8 | 2.0 | 61.0 | 60.0 | 58.5 | ○ | ○ |
| | 3 | 4 | 0.4 | 5 | 1.4 | 2 | 1.5 | 62.0 | 61.0 | 59.5 | ○ | ○ |
| | | | 0.4 | 6 | 1.4 | 7 | 0.8 | 64.5 | 62.5 | 60.0 | ○ | ○ |
| | | | 0.4 | 7 | 1.4 | 9 | 0.4 | 59.5 | 59.0 | 57.0 | ○ | ○ |
| | 4 | 1 | 0.1 | 5 | 0.9 | 1 | 2.0 | 64.0 | 62.5 | 60.0 | ○ | ○ |
| | | | 0.1 | 6 | 0.9 | 1 | 2.0 | 59.0 | 58.0 | 56.5 | ○ | ○ |
| | | | 0.1 | 7 | 0.9 | 1 | 2.0 | 60.5 | 60.0 | 57.5 | ○ | ○ |
| | | 2 | 0.05 | 5 | 0.95 | 1 | 2.0 | 60.0 | 59.0 | 57.0 | ○ | ○ |
| | | | 0.05 | 6 | 0.95 | 1 | 2.0 | 62.5 | 60.5 | 59.0 | ○ | ○ |
| | | | 0.05 | 7 | 0.95 | 1 | 2.0 | 63.5 | 60.5 | 59.5 | ○ | ○ |
| | 5 | 2 | 0.1 | 5 | 0.9 | 7 | 1.2 | 65.5 | 63.5 | 62.0 | ○ | ○ |
| | | | 0.1 | 6 | 0.9 | 7 | 1.2 | 64.0 | 60.5 | 59.5 | ○ | ○ |
| | | | 0.1 | 7 | 0.9 | 7 | 1.2 | 62.5 | 61.0 | 59.5 | ○ | ○ |
| | | | 0.15 | 5 | 0.85 | 12 | 1.1 | 64.0 | 62.0 | 58.5 | ○ | ○ |
| | | | 0.15 | 6 | 0.85 | 12 | 1.1 | 63.0 | 61.0 | 60.0 | ○ | ○ |
| | | | 0.15 | 7 | 0.85 | 12 | 1.1 | 61.5 | 60.5 | 59.5 | ○ | ○ |

*weight % based on cement
**weight % based on water

Example III using (a) and (b-C)

The average molecular weight of the copolymer (b-C) shown in the example was obtained from a molecular weight determined according to gel permeation chromatography/ converted in terms of polystyrenesulfonic acid.

The descriptions and marks of the monomer (b-C) used for the polymerization in the present invention are shown below:

C-1: methanol EO-methacrylic monoester (EO addition molar number=115).

C-2: methanol EO-methacrylic monoester (EO addition molar number=220).

C-3: methanol EO-methacrylic monoester (EO addition molar number=280).

C-4: acrylic acid EO adduct (EO addition molar number =130).

C-5: acrylic acid PO-EO block adduct (PO addition molar number=10, EO addition molar number=135).

C-6: acrylic acid EO-PO block adduct (EO addition molar number=135, PO addition molar number=5).

C-7: methanol EO-methacrylic monoester (EO addition molar number=23) (comparison).

C-8: methanol EO-methacrylic monoester (EO addition molar number=102) (comparison).

C-9: methanol EO-methacrylic monoester (EO addition molar number=350) (comparison).

The preparation examples of the copolymer (b-C) will be shown below.

Preparation Example 13 (Signal of the admixture: C-1)

Water of 10 moles was charged into a reactor equipped with a stirrer. The reactor was substituted with nitrogen while stirring, and the temperature was elevated up to 75° C. in nitrogen atmosphere. A solution prepared by mixing and dissolving C-1 of 0.09 mole and acrylic acid of 1 mole (mole ratio=9/100) in water of 7.5 moles, a 20% ammonium persulfate aqueous solution of 0.01 mole, and 2-mercaptoethanol of 4 g each were simultaneously dropped into the reactor over the period of 2 hours. Then, the 20% ammonium persulfate aqueous solution of 0.03 mole was dropped thereinto over the period of 30 minutes, and the solution in the reactor was ripened at the same temperature (75° C.) for one hour. After finishing ripening, the temperature was raised up to 95° C., and 35% hydrogen peroxide of 12 g was dropped over the period of one hour. The solution was then ripened at the same temperature (95° C.) for 2 hours. After finishing ripening, 48% sodium hydroxide of 0.7 mole was added for neutralization to thereby obtain the copolymer having a molecular weight of 22,000.

Preparation Example 14 (signal of the admixture: C-2)

Water of 8 moles was charged into a reactor equipped with a stirrer. The reactor was substituted with nitrogen while stirring, and the temperature was elevated up to 75° C. in nitrogen atmosphere. A solution prepared by mixing and dissolving C-2 of 0.05 mole and methacrylic acid of 1 mole (mole ratio=5/100) in water of 8.5 moles, a 20% ammonium persulfate aqueous solution of 0.01 mole, and 2-mercaptoethanol of 3 g each were simultaneously dropped into the reactor over the period of 2 hours. Then, the 20% ammonium persulfate aqueous solution of 0.03 mole was dropped thereinto over the period of 30 minutes, and the solution in the reactor was ripened at the same temperature (75° C.) for one hour. After finishing ripening, the temperature was raised up to 95° C., and 35% hydrogen peroxide of 9 g was dropped over the period of one hour. The solution was then ripened at the same temperature (95° C.) for 2 hours. After finishing ripening, 48% sodium hydroxide of 0.7 mole was added for neutralization to thereby obtain the copolymer having a molecular weight of 85,000.

Preparation Example 15 (signal of the admixture: C-3)

Water of 5 moles was charged into a reactor equipped with a stirrer. The reactor was substituted with nitrogen while stirring, and the temperature was elevated up to 95° C. in nitrogen atmosphere. A solution prepared by mixing and dissolving C-3 of 0.002 mole and monosodium maleate of 1 mole (mole ratio=0.2/100) In 90° C. warm water of 15 moles, a 20% ammonium persulfate aqueous solution of 0.01 mole, and 2-mercaptoethanol of 3 g each were simultaneously dropped into the reactor over the period of 2 hours. Then, the 20% ammonium persulfate aqueous solution of 0.03 mole was dropped thereinto over the period of 30 minutes, and the solution in the reactor was ripened at the same temperature (95° C.) for one hour. After finishing ripening, 35% hydrogen peroxide of 9 g was dropped at 95° C. over the period of one hour, and the solution was ripened at the same temperature (95° C.) for 2 hours. After finishing ripening, 48% sodium hydroxide of 0.7 mole was added for neutralization to thereby obtain the copolymer having a molecular weight of 12,000.

Preparation Example 16 (signal of the admixture: C-4)

Water of 10 moles was charged into a reactor equipped with a stirrer. The reactor was substituted with nitrogen while stirring, and the temperature was elevated up to 75° C. in nitrogen atmosphere. A solution prepared by mixing and dissolving C-4 of 0.01 mole, acrylic acid of 0.9 mole and sodium methallylsulfonate of 0.1 mole (mole ratio=1/90/10) in water of 7.5 moles, a 20% ammonium persulfate aqueous solution of 0.01 mole, and 2-mercaptoethanol of 4 g each were simultaneously dropped into the reactor over the period of 2 hours. Then, the 20% ammonium persulfate aqueous solution of 0.03 mole was dropped thereinto over the period of 30 minutes, and the solution in the reactor was ripened at the same temperature (75° C.) for one hour. After finishing ripening, the temperature was raised up to 95° C., and 35% hydrogen peroxide of 9 g was dropped over the period of one hour. The solution was then ripened at the same temperature (95° C.) for 2 hours. After finishing ripening, 48% sodium hydroxide of 0.6 mole was added for neutralization to thereby obtain the copolymer having a molecular weight of 7,200.

Preparation Example 17 (signal of the admixture: C-5)

Water of 10 moles was charged into a reactor equipped with a stirrer. The reactor was substituted with nitrogen while stirring, and the temperature was elevated up to 75° C. in nitrogen atmosphere. A solution prepared by mixing and dissolving C-5 of 0.01 mole and methacrylic acid of 1 mole (mole ratio=1/100) in water of 7.5 moles, a 20% ammonium persulfate aqueous solution of 0.01 mole, and 2-mercaptoethanol of 1 g each were simultaneously dropped into the reactor over the period of 2 hours. Then, the 20% ammonium persulfate aqueous solution of 0.03 mole was dropped thereinto over the period of 30 minutes, and the solution in the reactor was ripened at the same temperature (75° C.) for one hour. After finishing ripening, the temperature was raised up to 95° C., and 35% hydrogen peroxide of 5 g was dropped over the period of one hour. The solution was then ripened at the same temperature (95° C.) for 2 hours. After finishing ripening, 48 sodium hydroxide of 0.7 mole was added for neutralization to thereby obtain the copolymer having a molecular weight of 105,000.

Preparation Example 18(signal of the admixture: C-6)

Water of 10 moles was charged into a reactor equipped with a stirrer. The reactor was substituted with nitrogen while stirring, and the temperature was elevated up to 75° C. in nitrogen atmosphere. A solution prepared by mixing and dissolving C-6 of 0.01 mole and sodium acrylate of 1 mole (mole ratio=1/100) in water of 7.5 moles, a 20% ammonium persulfate aqueous solution of 0.01 mole, and 2-mercaptoethanol of 2 g each were simultaneously dropped into the reactor over the period of 2 hours. Then, the 20% ammonium persulfate aqueous solution of 0.03 mole was dropped thereinto over the period of 30 minutes, and the solution in the reactor was ripened at the same temperature (75° C.) for one hour. After finishing ripening, the temperature was raised up to 95° C., and a 35% hydrogen peroxide of 9 g was dropped over the period of one hour. The solution was then ripened at the same temperature (95° C.) for 2 hours. After finishing ripening, 48% sodium hydroxide of 0.7 mole was added for neutralization to thereby obtain the copolymer having a molecular weight of 77,000.

Preparation Example 19 (signal of the admixture: C-7)

Water of 23 moles was charged into a reactor equipped with a stirrer. The reactor was substituted with nitrogen while stirring, and the temperature was elevated up to 75° C. in nitrogen atmosphere. A solution prepared by mixing and dissolving C-2 of 0.045 mole and acrylic acid of 0.3 mole (mole ratio=15/100) in water of 10 moles, a 20% ammonium persulfate aqueous solution of 0.003 mole, and 2-mercaptoethanol of 1.2 g each were simultaneously dropped into the reactor over the period of 2 hours. Then, the 20% ammonium persulfate aqueous solution of 0.009 mole was dropped thereinto over the period of 30 minutes, and the solution in the reactor was ripened at the same temperature (75° C.) for one hour. After finishing ripening, the temperature was raised up to 95° C., and 35% hydrogen peroxide of 4 g was dropped over the period of one hour. The solution was then ripened at the same temperature (95° C.) for 2 hours. After finishing ripening, 48% sodium hydroxide of 0.21 mole was added for neutralization to thereby obtain the copolymer having a molecular weight of 51,000.

Preparation Example 20 (signal of the admixture: C-8)

Water of 23 moles was charged into a reactor equipped with a stirrer. The reactor was substituted with nitrogen while stirring, and the temperature was elevated up to 75° C. in nitrogen atmosphere. A solution prepared by mixing and dissolving C-1 of 0.08 mole and acrylic acid of 0.2 mole (mole ratio=40/100) in water of 12 moles, a 20% ammonium persulfate aqueous solution of 0.002 mole, and 2-mercaptoethanol of 0.6 g each were simultaneously dropped into the reactor over the period of 2 hours. Then, the 20% ammonium persulfate aqueous solution of 0.006 mole was dropped thereinto over the period of 30 minutes, and the solution in the reactor was ripened at the same temperature (75° C.) for one hour. After finishing ripening, the temperature was raised up to 95° C., and 35% hydrogen peroxide of 3 g was dropped over the period of one hour. The solution was then ripened at the same temperature (95° C.) for 2 hours. After finishing ripening, 48% sodium hydroxide of 0.14 mole was added for neutralization to thereby obtain the copolymer having a molecular weight of 56,000.

Preparation Example 21 (signal of the admixture: C-9)

Water of 18 moles was charged into a reactor equipped with a stirrer. The reactor was substituted with nitrogen while stirring, and the temperature was elevated up to 75° C. in nitrogen atmosphere. A solution prepared by mixing and dissolving C-1 of 0.06 mole and acrylic acid of 0.1 mole (mole ratio=60/100) in water of 8 moles, a 20% ammonium persulfate aqueous solution of 0.001 mole, and 2-mercaptoethanol of 0.3 g each were simultaneously dropped into the reactor over the period of 2 hours. Then, the 20% ammonium persulfate aqueous solution of 0.003 mole was dropped thereinto over the period of 30 minutes, and the solution in the reactor was ripened at the same temperature (75° C.) for one hour. After finishing ripening, the temperature was raised up to 95° C., and 35% hydrogen peroxide of 2 g was dropped over the period of one hour. The solution was then ripened at the same temperature (95° C.) for 2 hours. After finishing ripening, 48% sodium hydroxide of 0.07 mole was added for neutralization to thereby obtain the copolymer having a molecular weight of 45,000.

Preparation Example 22 (signal of the admixture: C-10)

Water of 30 moles was charged into a reactor equipped with a stirrer. The reactor was substituted with nitrogen while stirring, and the temperature was elevated up to 75° C. in nitrogen atmosphere. A solution prepared by mixing and dissolving C-1 of 0.1 mole and acrylic acid of 0.1 mole (mole ratio=100/100) in water of 13 moles, a 20% ammonium persulfate aqueous solution of 0.001 mole, and 2-mercaptoethanol of 0.3 g each were simultaneously dropped into the reactor over the period of 2 hours. Then, the 20% ammonium persulfate aqueous solution of 0.003 mole was dropped thereinto over the period of 30 minutes, and the solution in the reactor was ripened at the same temperature (75° C.) for one hour. After finishing ripening, the temperature was raised up to 95° C., and 35% hydrogen peroxide of 2 g was dropped over the period of one hour. The solution was then ripened at the same temperature (95° C.) for 2 hours. After finishing ripening, 48% sodium hydroxide of 0.07 mole was added for neutralization to thereby obtain the copolymer having a molecular weight of 72,000.

preparation Example 23 (signal of the admixture: C-11)

Water of 10 moles was charged into a reactor equipped with a stirrer. The reactor was substituted with nitrogen while stirring, and the temperature was elevated up to 75° C. in nitrogen atmosphere. A solution prepared by mixing and dissolving C-7 of 0.1 mole and acrylic acid of 1 mole (mole ratio=10/100) in water of 7.5 moles, a 20% ammonium persulfate aqueous solution of 0.01 mole, and a2-mercaptoethanol of 4 g each were simultaneously dropped into the reactor over the period of 2 hours. Then, the 20% ammonium persulfate aqueous solution of 0.03 mole was dropped thereinto over the period of 30 minutes, and the solution in the reactor was ripened at the same temperature (75° C.) for one hour. After finishing ripening, the temperature was raised up to 95° C., and 35% hydrogen peroxide of 12 g was dropped over the period of one hour. The solution was then ripened at the same temperature (95° C.) for 2 hours. After finishing ripening, 48% sodium hydroxide of 0.7 mole was added for neutralization to thereby obtain the copolymer having a molecular weight of 11,000.

Preparation Example 24 (signal of the admixture: C-12)

Water of 10 moles was charged into a reactor equipped with a stirrer. The reactor was substituted with nitrogen while stirring, and the temperature was elevated up to 75° C. in nitrogen atmosphere. A solution prepared by mixing and dissolving C-8 of 0.05 mole and acrylic acid of 1 mole (mole ratio=5/100) in water of 7.5 moles, a 20% ammonium persulfate aqueous solution of 0.01 mole, and 2-mercaptoethanol of 3 g each were simultaneously dropped into the reactor over the period of 2 hours. Then, the 20% ammonium persulfate aqueous solution of 0.03 mole was dropped thereinto over the period of 30 minutes, and the solution in the reactor was ripened at the same temperature (75° C.) for one hour. After finishing ripening, the temperature was raised up to 95° C., and 35% hydrogen peroxide of 10 g was dropped over the period of one hour. The solution was then ripened at the same temperature (95° C.) for 2 hours. After finishing ripening, 48% sodium hydroxide of 0.7 mole was added for neutralization to thereby obtain the copolymer having a molecular weight of 31,000.

Preparation Example 25 (signal of the admixture: C-13)

Water of 5 moles was charged into a reactor equipped with a stirrer. The reactor was substituted with nitrogen while stirring, and the temperature was elevated up to 95° C. in nitrogen atmosphere. A solution prepared by mixing and dissolving C-9 of 0.005 mole and acrylic acid of 1 mole (mole ratio=0.5/100) in 75° C. warm water of 15 moles, a 20% ammonium persulfate aqueous solution of 0.01 mole, and 2-mercaptoethanol of 3 g each were simultaneously dropped into the reactor over the period of 2 hours. Then, the 20% ammonium persulfate aqueous solution of 0.03 mole was dropped over the period of 30 minutes, and the solution in the reactor was ripened at the same temperature (95° C.) for one hour. After finishing ripening, 35% hydrogen peroxide of 9 g was dropped thereinto at 95° C. over the period of one hour, and the solution was ripened at the same temperature (95° C.) for 2 hours. After finishing ripening, 48% sodium hydroxide of 0.7 mole was added for neutralization to thereby obtain the copolymer having a molecular weight of 25,000.

The descriptions and marks of comparative admixtures used in the comparative examples as well as the comparative polymers of the copolymers will be shown below:

Mark NS of the admixture: naphthalene series dmixture (Mighty 150, manufactured by Kao Corporation).

Mark MS of the admixture: melamine series admixture (Mighty 150V-2, manufactured by Kao Corporation).

A test for evaluation was carried out in the same manner as that in Example 1 excluding the following.

<Concrete blend and materials used>

The concrete blend and the materials are shown in Table 6.

TABLE 6

| | | Concrete blend and materials | | | | |
|---|---|---|---|---|---|---|
| W/C | s/a | | | Unit amount (kg/cm$^2$) | | |
| (%) | (%) | C | W | ST | S | G |
| 45 | 42.2 | 370 | 178 | 124 | 745 | 867 |

Setting time:

Coagulation time measured by a proctor penetration resistance test according to JIS A 6204.

Compressive strength:

Compressive strength test according to JIS A 1123.

The above measuring results are shown in Table 7.

TABLE 7

| Division | Copolymer (b − C) Mark | Water soluble polymer (a)*[1] Mark | Weight blend ratio (b − C) / (a) | Added amount*[2] (b − C) + (a) | Slump flow value (cm) | Segregation resistance | Self-packing property | Setting time (hour-minute) Start | End | Compression strength (strength 24 hrs) (kgf/cm$^2$) |
|---|---|---|---|---|---|---|---|---|---|---|
| Invention | c-1 | 1 | 93/7 | 0.28 | 55.0 | ○ | ○ | 6-40 | 8-57 | 120 |
| | | | 84/16 | 0.31 | 58.0 | | | 6-42 | 9-05 | 118 |
| | | | 72/28 | 0.36 | 60.0 | | | 6-51 | 9-11 | 110 |
| | c-2 | 2 | 73/27 | 0.37 | 59.0 | ○ | ○ | 6-48 | 9-13 | 101 |
| | c-3 | 3 | 86/14 | 0.35 | 58.5 | ○ | ○ | 6-50 | 9-20 | 110 |

TABLE 7-continued

| Division | Copolymer (b – C) Mark | Water soluble polymer (a)*1 Mark | Weight blend ratio (b – C) / (a) | Added amount*2 (b – C) + (a) | Slump flow value (cm) | Segregation resistance | Self-packing property | Setting time (hour-minute) Start | Setting time (hour-minute) End | Compression strength (strength 24 hrs) (kgf/cm²) |
|---|---|---|---|---|---|---|---|---|---|---|
| | c-4 | 4 | 37/63 | 0.71 | 58.0 | ○ | ○ | 7-18 | 9-35 | 102 |
| | c-5 | 5 | 73/27 | 0.37 | 58.5 | ○ | ○ | 6-46 | 8-55 | 113 |
| | c-6 | 1 | 44/56 | 0.63 | 59.0 | ○ | ○ | 7-08 | 9-13 | 105 |
| | c-7 | 2 | 53/47 | 0.64 | 60.0 | ○ | ○ | 7-02 | 9-22 | 110 |
| | c-8 | 3 | 44/56 | 0.81 | 57.5 | ○ | ○ | 7-46 | 9-53 | 98 |
| | c-9 | 4 | 89/11 | 0.39 | 60.0 | ○ | ○ | 7-10 | 9-21 | 105 |
| | c-10 | 5 | 95/5 | 0.41 | 56.5 | ○ | ○ | 7-33 | 9-46 | 98 |
| Comparison | c-11 | 1 | 88/12 | 0.40 | 55.5 | X | ○ | 11-41 | 14-50 | 45 |
| | c-12 | 2 | 80/20 | 0.50 | 55.0 | X | Δ | 12-01 | 14-10 | 41 |
| | c-13 | 3 | 92/8 | 0.60 | 56.0 | ○ | X | 12-30 | 14-27 | 37 |
| | NS | 1 | 98/2 | 3.05 | 43.0 | X | X | 12-30 | 14-26 | 40 |
| | MS | 1 | 98/2 | 3.05 | 41.0 | X | X | 12-20 | 14-31 | 39 |
| | — | 1 | — | 0.05 | 24.0 | X | X | 10-19 | 12-13 | 42 |
| | c-1 | — | — | 0.24 | 56.0 | X | X | 6-10 | 7-59 | 80 |

*1: (a) in Table 3 was used
*2: solid matter % based on cement

<Evaluation results>

As apparent from the results shown in Table 6, it can be found that the admixtures of the present invention show a flowability in low addition amounts as compared with those of the comparative admixtures and have large segregation resistances of materials, excellent self-packing properties and short setting time. These results lead to marked improvement in a method for applying concrete, and effects on noise prevention, the rationalization of production processes and the shortening of a construction period in the production of concrete products are expected.

As apparent from the results described above, the hydraulic compositions of the present invention show the high flowabilities of 50 cm or more in terms of the slump flow value and have the good segregation resistance, which lead to securing the excellent self-packing property.

On the other hand, while in case of comparative products, the use of the superplasticizers provides the satisfactory segregation resistance, even the addition of superplasticizers in a proportion of 5% provides a slump value of about 45 cm, and therefore the sufficient self-packing property is not obtained. Further, it can be found that since the use of water soluble polymers such as methyl cellulose provides a function to markedly lower a flowability, an excellent self-packing property is not obtained.

What is claimed is:

1. A hydraulic composition comprising (a) a water soluble polymer, (b) a superplasticizer which is a copolymer obtained by polymerizing a monomer (C-1) represented by the following Formula (1) with at least one monomer (C-2) selected from the compounds represented by the following Formulas (2) and (3):

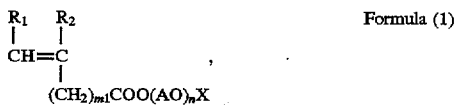

Formula (1)

wherein $R_1$ and $R_2$ each represent hydrogen or methyl; ml represents an integer of 0 to 32; AO represents an oxyalkylene group having a carbon number of 2 to 3; n represents an integer of 2 to 300; and X represents hydrogen or an alkyl group having a carbon number of 1 to 3);

Formula (2)

Formula (3)

(wherein $R_3$ to $R_5$ each represent hydrogen, methyl or $(CH2)_{m2}COOM_2$; $R_6$ represents hydrogen or methyl; $M_1$, $M_2$ and Y each represent hydrogen, alkali metal, alkaline earth metal, ammonium, alkylammonium, or substituted alkylammonium; and $M_2$ represents an integer of 0 to 2); and (c) a hydraulic powder.

2. The composition as claimed in claim 1, wherein a slump value in the slump test stipulated in JIS A 1101 falls in a range of 50 to 70 cm.

3. The composition as claimed in claim 1, wherein the copolymer has a mole ratio of (C-1) to (C-2) in the range between 0.1/100 and 100/100.

4. The composition as claimed in claim 1, wherein the copolymer has a weight-average molecular weight of 3000 to 1000000 according to gel permeation chromatographic method as sodium polystyrene sulfonate.

5. The composition as claimed in claim 1, in which a weight ratio of (a) to (b) ranges from 95/5 to 5/95.

6. The composition as claimed in claim 1, in which the water-soluble polymer (a) is an associacive thickener.

7. The composition as claimed in claim 1, in which the water-soluble polymer (a) is an alkylene oxide adduct to an organic compound having at least one functional or active group selected from the group consisting of mercapto, alcoholic hydroxyl, phenolic hydroxyl, amino and carboxyl.

8. The composition as claimed in claim 1, in which the water-soluble polymer (a) is a polyalkylene oxide derivative obtained by addition of 10 to 1000 moles of alkylene oxide to a monohydric alcohol having 6 to 30 carbon atoms in the molecule, a monovalent mercaptan compound having 6 to 30 carbon atoms in the molecule, or an alkylphenol having 6 to 30 carbon atoms in the molecule.

9. The composition as claimed in claim 1, in which (a) is an associative thickener being an adduct of 10 to 1000 moles of an alkylene oxide to an organic compound having an active hydrogen atom in its functional or active group and 6 to 30 carbon atoms.

* * * * *